(12) United States Patent
May et al.

(10) Patent No.: US 7,142,350 B2
(45) Date of Patent: Nov. 28, 2006

(54) COLOR WHITEBOARD STYLUS AND DISPLAY

(75) Inventors: Gregory J. May, Corvallis, OR (US); Philip S. Burkum, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

(21) Appl. No.: 10/960,795

(22) Filed: Oct. 7, 2004

(65) Prior Publication Data

US 2006/0077171 A1   Apr. 13, 2006

(51) Int. Cl.
*G02B 26/00* (2006.01)
*G09G 3/34* (2006.01)
*C02F 1/40* (2006.01)
*G03G 17/04* (2006.01)

(52) U.S. Cl. .................. 359/296; 345/107; 204/600; 430/32

(58) Field of Classification Search ............. 359/296; 345/107; 204/450, 600; 430/32
See application file for complete search history.

(56) References Cited

U.S. PATENT DOCUMENTS

| 6,130,774 | A | 10/2000 | Albert et al. | |
|---|---|---|---|---|
| 6,177,921 | B1 | 1/2001 | Comiskey et al. | |
| 6,232,950 | B1 | 5/2001 | Albert et al. | |
| 6,831,771 | B1 * | 12/2004 | Ho et al. | 359/296 |
| 6,862,016 | B1 * | 3/2005 | Matsuura et al. | 345/107 |
| 2002/0075420 | A1 | 6/2002 | Zhang et al. | |
| 2006/0020469 | A1 * | 1/2006 | Rast | 704/270 |

* cited by examiner

*Primary Examiner*—Ricky Mack
*Assistant Examiner*—William Choi (57) ABSTRACT

This invention relates to a display device, the device comprising: a transparent surface; a suspension media disposed against the transparent surface; a plurality of color particles disposed throughout the suspension media, wherein each color of particle has a different time response to an applied electric field than each other color of particle; and an input instrument located substantially adjacent to the transparent surface such that the input instrument is operated to cause a portion of the color particles to migrate towards the transparent surface.

65 Claims, 5 Drawing Sheets

FOR A GIVEN FIELD PULSE STRENGTH AND DURATION, PARTICLE MOVEMENT B = 2/3 A, C = 1/3 A. RELATIVE (PULSE DURATIONS) SCALED 1-30, 1 BEING LOW.

| CASE 1 | | | | | | DISTANCE THROUGH SUSPENSION VEHICLE | | | | | | VIEWING SURFACE |
|---|---|---|---|---|---|---|---|---|---|---|---|---|
| PULSE | | 1 | 2 | 3 | 4 | 5 | 6 | 7 | 8 | 9 | 10 | |
| POLARITY | DURATION | | | | | | | | | | | |
| + | 10 | | | | | | | | | | C | |
| | | CYAN | | | | | | | | | | |
| | | YELLOW | | | | | | Y | | | | |
| | | MAGENTA | | M | | | | | | | | |
| RESULTING COLOR: | | | | | | | | | | | | CYAN |

FIG.3A

FOR A GIVEN FIELD PULSE STRENGTH AND DURATION, PARTICLE MOVEMENT B = 2/3 A, C = 1/3 A.
RELATIVE (PULSE DURATIONS) SCALED 1-30, 1 BEING LOW.

CASE 2

| PULSE | | DISTANCE THROUGH SUSPENSION VEHICLE | | | | | | | | | | VIEWING SURFACE |
|---|---|---|---|---|---|---|---|---|---|---|---|---|
| POLARITY | DURATION | | 1 | 2 | 3 | 4 | 5 | 6 | 7 | 8 | 9 | 10 |
| + | 15 | CYAN | | | | | | | | | | C |
| | | YELLOW | | | | | | | | | | Y |
| | | MAGENTA | | | | | | | M | | | |

THEN,

| PULSE | | DISTANCE THROUGH SUSPENSION VEHICLE | | | | | | | | | | VIEWING SURFACE |
|---|---|---|---|---|---|---|---|---|---|---|---|---|
| POLARITY | DURATION | | 1 | 2 | 3 | 4 | 5 | 6 | 7 | 8 | 9 | 10 |
| − | 3 | CYAN | | | | | | | C | | | |
| | | YELLOW | | | | | | | | Y | | |
| | | MAGENTA | | | | | | M | | | | |

THEN,

| PULSE | | DISTANCE THROUGH SUSPENSION VEHICLE | | | | | | | | | | VIEWING SURFACE |
|---|---|---|---|---|---|---|---|---|---|---|---|---|
| POLARITY | DURATION | | 1 | 2 | 3 | 4 | 5 | 6 | 7 | 8 | 9 | 10 |
| + | 1 | CYAN | | | | | | | | C | | |
| | | YELLOW | | | | | | | | | Y | |
| | | MAGENTA | | | | | | M | | | | |

RESULTING COLOR: YELLOW

FIG. 3B

FOR A GIVEN FIELD PULSE STRENGTH AND DURATION, PARTICLE MOVEMENT B = 2/3 A, C = 1/3 A.
RELATIVE (PULSE DURATIONS) SCALED 1-30, 1 BEING LOW.

| CASE 3 | | | | | | | | | | | | | |
|---|---|---|---|---|---|---|---|---|---|---|---|---|---|
| PULSE | | | | | | | | | | | | | |
| POLARITY | DURATION | | DISTANCE THROUGH SUSPENSION VEHICLE | | | | | | | | | | VIEWING SURFACE |
| + | 30 | | 1 | 2 | 3 | 4 | 5 | 6 | 7 | 8 | 9 | 10 | |
| | | CYAN | | | | | | | | | | C | |
| | | YELLOW | | | | | | | | | | Y | |
| | | MAGENTA | | | | | | | | | | M | |
| | | | | | | | | | | | | | |
| THEN, | | | | | | | | | | | | | |
| PULSE | | | | | | | | | | | | | |
| POLARITY | DURATION | | DISTANCE THROUGH SUSPENSION VEHICLE | | | | | | | | | | VIEWING SURFACE |
| – | 6 | | 1 | 2 | 3 | 4 | 5 | 6 | 7 | 8 | 9 | 10 | |
| | | CYAN | | | C | | | | | | | | |
| | | YELLOW | | | | | Y | | | | | | |
| | | MAGENTA | | | | | | | M | | | | |
| | | | | | | | | | | | | | |
| THEN, | | | | | | | | | | | | | |
| PULSE | | | | | | | | | | | | | |
| POLARITY | DURATION | | DISTANCE THROUGH SUSPENSION VEHICLE | | | | | | | | | | VIEWING SURFACE |
| + | 2 | | 1 | 2 | 3 | 4 | 5 | 6 | 7 | 8 | 9 | 10 | |
| | | CYAN | | | | | C | | | | | | |
| | | YELLOW | | | | | | Y | | | | | |
| | | MAGENTA | | | | | | | | M | | | |
| RESULTING COLOR: | | | | | | | | | | MAGENTA | | | |

FIG.3C

COLOR WHITEBOARD STYLUS AND DISPLAY

BACKGROUND OF THE INVENTION

1. Field of the Invention

This invention relates to a display device, the device comprising: a transparent surface; a suspension media disposed against the transparent surface; a plurality of color particles disposed throughout the suspension media, wherein each color of particle has a different time response to an applied electric field than each other color of particle; and an input instrument located substantially adjacent to the transparent surface such that the input instrument is operated to cause a portion of the color particles to migrate towards the transparent surface.

2. Description of the Related Art

Prior to the present invention, as set forth in general terms above and more specifically below, whiteboards are a well-known medium used to facilitate personal thoughts and group discussions by providing a convenient surface upon which notes, drawings, charts, and other annotations may be made. As with the traditional chalkboards, whiteboards allow annotations to be made in multiple colors and then erased. However, whiteboards offer several advantages over chalkboards, including a clean white surface which provides for greater contrast over the traditional green background of chalkboards. In addition, writing on a whiteboard is easier for many than on the traditional chalkboard. For example, the smooth writing surface of the whiteboard allows easy use of the erasable felt tip markers whereas the chalkboard surface provides a somewhat rough textured surface to hold chalk which is used for writing on such surfaces. In addition, many users prefer a whiteboard to a chalkboard simply because the marker may be gripped more comfortably than chalk and does not leave residue on the user's hand when gripped.

It is also known that displays made with a technology known as electronic ink, or E-ink, are in the process of commercial development. While the early versions are expected to resemble simple displays that might sit by the side of a highway to warn of trouble ahead or might advertise specials at a convenience store, later versions are expected to lead to electronic books with paper-like pages and illustrations that move, newspapers that update themselves, reusable paper displays for cellular phones, disposable TV screens, and even electronic wallpaper.

There are two presently-known competing technologies: E-Ink's electrophoretic displays and Xerox's gyricon spheres.

With respect to E-ink, an encapsulated electrophoretic display includes one or more species of particles that either absorb or scatter light. One example is a system in which the capsules contain one or more species of mobile particles dispersed in a dyed suspending medium. Another example is a system in which the capsules contain two separate species of particles suspended in a clear suspending fluid, in which one of the species of particles absorbs light (black), while the other species of particles scatters light (white). The particles are commonly solid pigments, dyed particles, or pigment/polymer composites. A major disadvantage of this display is the lack of a variety of colors. Currently, only a single color (black) is available.

It is further known that the Gyricon display, also called the twisting-ball display, rotary ball display, particle display, dipolar particle light valve, etc., offers a technology for making a form of electric paper. Briefly, the Gyricon display is an addressable display made up of a multiplicity of optically anisotropic balls, each of which can be selectively rotated to present a desired face to an observer. Thus, in one version at least, the gyricon is a solid microsphere, hemispherically-colored black and white and having hemispherically-opposing zeta potentials. Each gyricon rotates within a dielectric oil-filled microcavity formed in the media upon exposure to an externally-applied electric field.

As discussed above, the primary disadvantages of both electrophoretic ink and the gyricon are the lack of color choices, poor contrast, and limited image resolution. Hemispherically-colored microspheres, or microcapsules, being fully three dimensional, have backside reflection and scattering that reduce the contrast of dark and white images reflected toward the observer.

It is even further known to use shuttering techniques, similar to LED technology. However, this technique also has low reflective efficiency since external light must pass through a stack of semi-transparent materials. Also, the shuttering structure blocks reflection around pixel boundaries.

Finally, it is known to use techniques that require the color elements to be precisely aligned with the driving backplane. Consequently, a more advantageous system, then, would be provided if a whiteboard stylus and display could be developed which were low in cost, required less power, utilized ambient light viewing, and offered a variety of colors.

It is apparent from the above that there exists a need in the whiteboard display art for a whiteboard stylus and display which were low in cost, required less power, utilized ambient light viewing, and offered a variety of colors. It is a purpose of this invention to fulfill this and other needs in the art in a manner more apparent to the skilled artisan once given the following disclosure.

SUMMARY OF THE INVENTION

Generally speaking, an embodiment of this invention fulfills these needs by providing a display device, the device comprising: a transparent surface; a suspension media disposed against the transparent surface; a plurality of color particles disposed throughout the suspension media, wherein each color of particle has a different time response to an applied electric field than each other color of particle; and an input instrument located substantially adjacent to the transparent surface such that the input instrument is operated to cause a portion of the color particles to migrate towards the transparent surface.

In certain preferred embodiments, the various colors of particles are constructed of different sized particles that require different charges in order to migrate towards the transparent surface. Also, the particles could have same charge, but by the nature of their physical size, their speed is different as they pass through the media. Finally, the input instrument can be operated to provide a pulse sequence that would vary for each color of particle so as to cause each color of particle to migrate towards the transparent surface.

The preferred whiteboard display, according to various embodiments of the present invention, offers the following advantages: ease-of-use; reduced cost; reduced power consumption, bi-stability; utilizes ambient light viewing; offers a variety of colors; and increased economy. In fact, in many of the preferred embodiments, these factors of reduced cost, reduced power consumption, use of ambient light viewing, and a variety of colors are optimized to an extent that is considerably higher than heretofore achieved in prior, known whiteboard displays.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
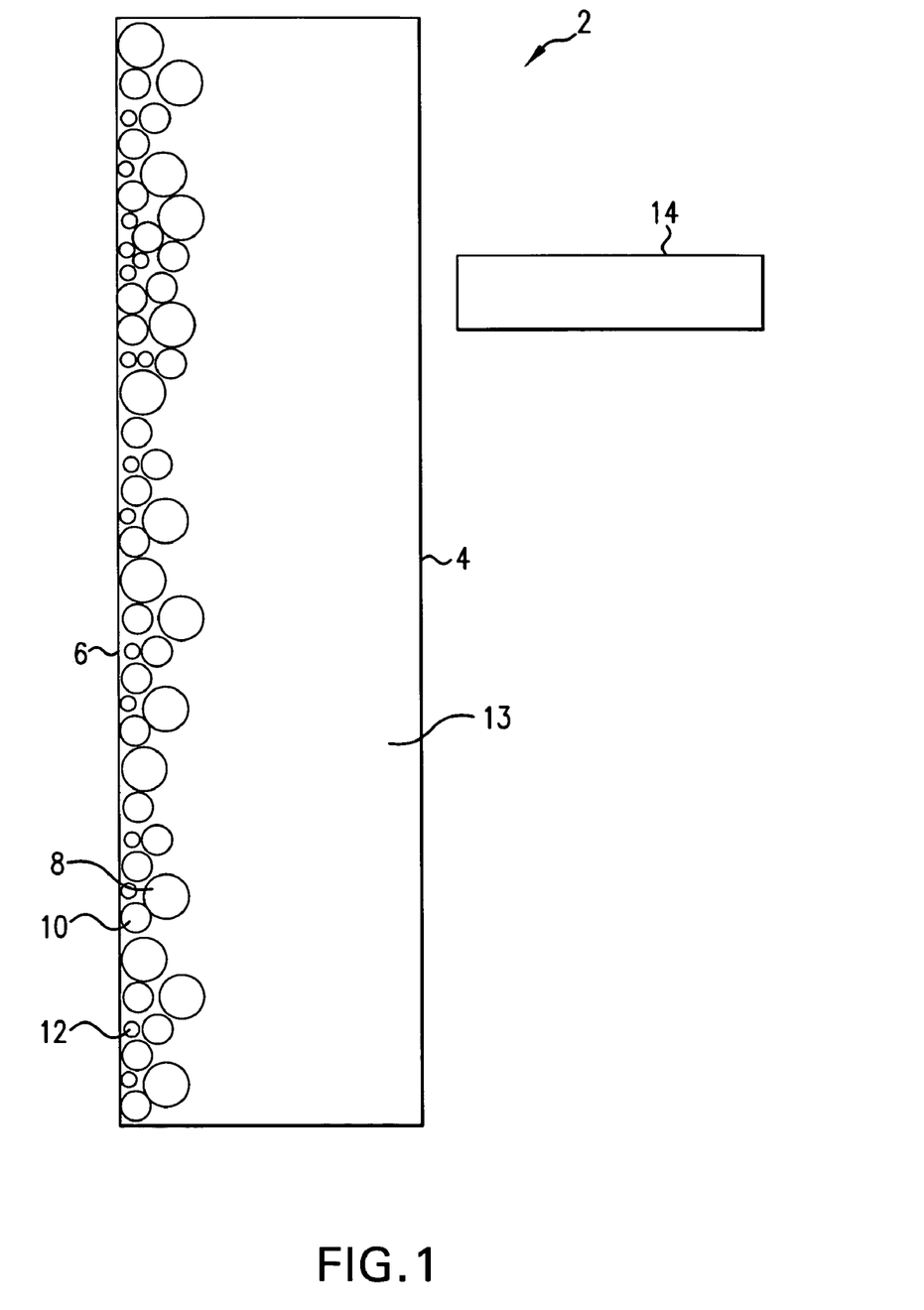
FIG. 1 is a schematic illustration of a color whiteboard display and stylus, according to one embodiment of the present invention.

With reference first to FIG. 1, there is illustrated one preferred embodiment for use of the concepts of this invention. With respect to FIG. 1, color whiteboard system 2 is illustrated. Color whiteboard system 2 includes, in part, front surface 4, backplate 6, color particles (8, 10, and 12), suspension 13, and input instrument (stylus) 14

Preferably, front surface 4 is constructed of any suitable transparent material such as PET (polyethylene terephthalate). The pixilated-conductor plane should be adjacent to the stylus. Also, it is to be understood to use a conductive plane for each pixel area to evenly distribute charge from the stylus over the entire pixel area, to attract an entire pixel area of colorant. However, the best results will depend upon the assumption that a uniform layer would be best for the optical pass through side of the screen so that no interference patterns can be seen.

With respect to backplate 6, backplate 6 is constructed of any suitable material that is able to conduct electricity so that stylus 14 is able to apply an electric field to color particles 8, 10, 12. Preferably, backplate 6 is constructed of any suitable opaque material such as coated PET or a white-colorant-impregnated plastic. It is to be understood that backplate 6 can include a conductive material applied to backplate 6 either as a continuous plane (for simple non-data transmitting whiteboard applications) or in cell patterns at a desired size to also limit the particle settling and provide a uniform distribution of color particles. The limits of these cells will be based upon the size of the color particles 8, 10, 12 with adequate coverage for the various colored particles.

With respect to color particles 8, 10, 12, these can be contained in a number of ways. For example, color particles 8, 10, 12 could be contained in glass spheres. Also, the color particles could be contained in a cell or well (possibly printed) having a transparent top surface.

In the case of containing the color particles in a dispersing fluid between backplate 6 and front surface 4, the thickness of the dispersing fluid can be controlled by standoff features on backplate 6 and/or the front surface 4, or by placing controlled diameter color particles or spheres in the suspension which act as spacers between the upper and lower surfaces. These spacers would also inhibit the migration of these particles away from an even distribution, thereby enhancing the more even distribution of the color particles.

Finally, the diameter, mass, and/or charge for the different colors of the color particles can be varied so that particles of each color will take a different amount of time to migrate to the viewable surface, where external light will reflect desired colors of light from the particles and/or remaining PSF. The different migration times between particles for each color will enable the user to select how much of which color will migrate for any given pixel location. By controlling field pulse lengths and/or magnitudes, and field polarity, the user can selectively migrate and leave colors at the viewable surface. Also, a reset pulse can be used to pull all material to a known state.

If a pixilated front conductor plane is utilized, an erase bar can be employed to sweep across the plane at a controlled speed to ensure that a minimum reverse-bias duration is used to complete the erase. Alternatively, a conductive plane could be placed over the pixilated conductors to create the reverse bias in one operation.

Finally, suspension material 13 can show some color particles at some small distance from the front surface. In other words, "the spheres come out of the fog" as they approach front surface 4 and the result in an appearance of an overall color.

With respect to suspension 13, suspension 13, preferably, should be any suitable particle suspension fluid (PSF) having a low dielectric constant between backplate 6 and front surface 4 that is translucent and white-reflective which is capable of retaining particles 8, 10, 12 while allowing them to migrate towards/away from front surface 4 when the electric field is applied. Also note that suspension material 13 does not have to be white. It can be black, as well, and white balls and other colors can be used.

With respect to stylus 14, stylus 14, preferably, is a strobe contained in a writing pen that is designed to present electric field patterns at the point of the pen that substantially contacts front surface 4. It is to be understood that stylus 14 does not have to contact front surface 4. It is to be further understood that the electric field patterns should be strong enough to pass between backplate 6 and stylus 14, thereby creating the electric-field force that acts on the charged colorant to "pull color" to front surface 4. It is to be even further understood that front surface 4 can be erased by applying a reverse voltage potential to backplate 6 and/or the stylus 14, in order to pull the color particles away from front surface 4. This can be done with the back of stylus 14 or reversing the charge pulse pattern generated in stylus 14. It is to be understood that stylus 14 does not have to be tethered, but may be pre-charged with respect to front surface 4 by conventional charging devices (not shown). Also, the reverse side of stylus 14 could be oppositely charged to repel the color particles 8, 10, 12 and more importantly, can have an electronic strobing applied so that stylus 14 can "subtract" certain color particles rather than just pushing all of the color particles away from front surface 4 which would result in an opaque color background screen color. It is to be understood that the user can "subtract color" by applying a unique reverse pulse pattern in much the same way as color is applied by pulling particles to the front surface 4 by using a pulse pattern. This can also be done in reverse to push away certain colors. Note it is important to understand that one stylus 14 or multiple stylus 14, held in one point, can be held and a pulse pattern can be applied that effectively resets particles 8, 10, 12, pulls all the particles or repels particles depending all on the pulse pattern that it presents to front surface 4. By holding stylus 14 active in one place, it does not eventually pull all the particles to front surface 4—this is where the unique pulse pattern will essentially maintain the appearance of color due to the pulse cycles being small enough. It may show a flicker, but that would only occur under the stylus contact point. In order to keep the color particles from migrating either towards front surface 4 or backplate 6, the electric voltage potential on backplate 6 is turned to ground. Stylus 14 could be the only active element and by applying different voltage potentials, stylus 14 can pull the color particles towards front surface 4 or erase the color from front surface 4 (or be applied to the back surface and erase colors from the front surface). It is to be further understood that numerous styli 14 can be employed such that the styli include patterns and/or colors that designate the color(s) that to which a particular styli 14 is able to pull towards front surface 4. For example, a stylus 14 that is colored red would only be capable of pulling red color particles towards front surface 4. The reset can be performed by back plate 6 or a combination of the backplate 6 and front surface 4 being charged for a long enough time or the stylus 14 performing that function as it passes over the particles. It is to be understood that back plate 6 may be turned on and stylus 14 is also on and fight each other. It is possible to do this in unison with stylus 14 to effectively pick whatever color to subtract or add by the "difference" in charge that results within this pulse pattern. Also, stylus 14 and backplate 6 could work in unison to create a differential pulse pattern by pulsing backplate 6 with a zero average bias which would tend to keep the particles stable and less influenced by any outside/stray fields. Stylus 14 would have a complementary pattern to create a dynamic differential to pull or repel particles.

Figure 2:
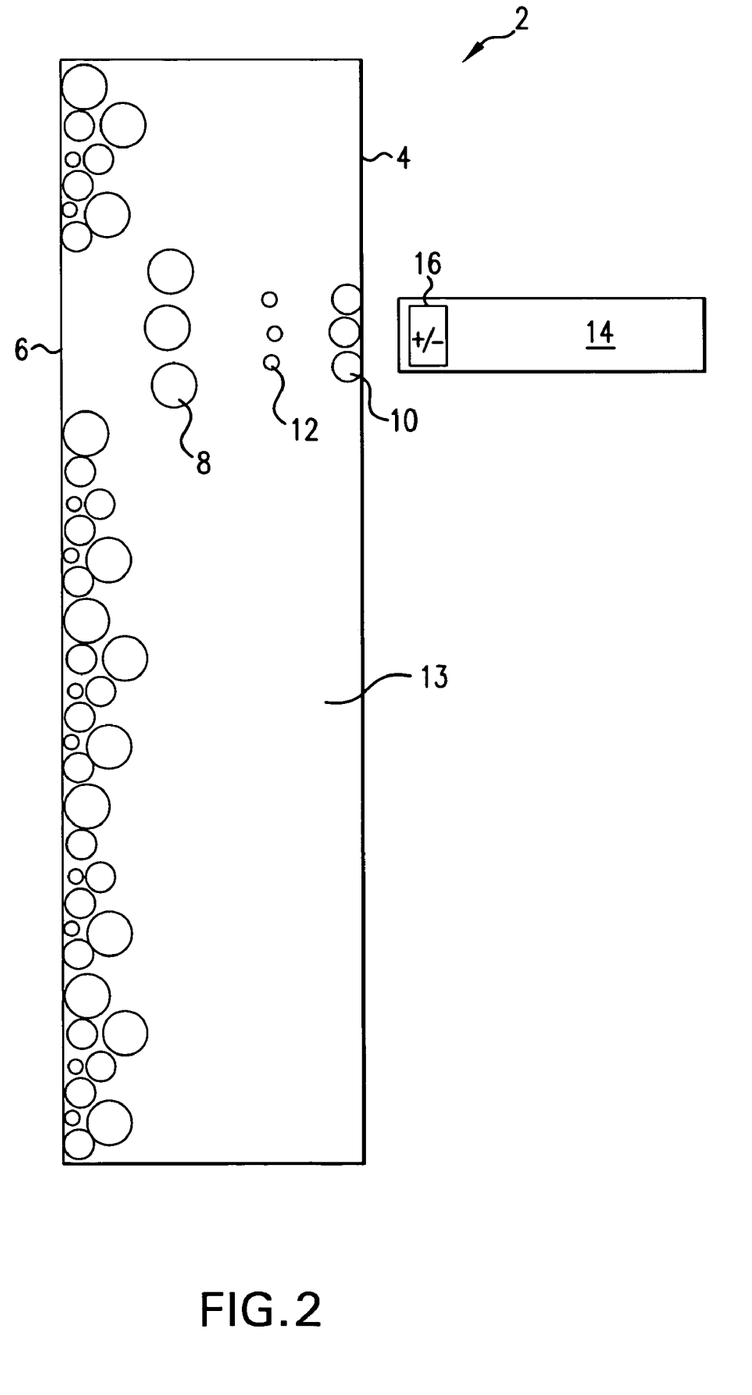
FIG. 2 is a schematic illustration of the color whiteboard display and stylus of FIG. 1, wherein the stylus has been activated, according to another embodiment of the present invention.

With respect to FIG. 2, the activation of stylus 14 is illustrated. As shown in FIG. 2, after a charge 16 has been created in stylus 14, charge 16 causes color particles 8, 10, 12 to migrate towards front surface 4. It is to be understood that stylus 14 could be charged with a magnetic field. As discussed above, the charge field patterns of charge 16 can be varied to create different migration times between particles for each color so as to enable the user to select how much of which color the migrate for any given pixel location. By controlling field pulse lengths and/or magnitudes, and field polarity, the user can selectively migrate and leave colors at the viewable surface. It is to be understood that the colors of all of the particles of the same size, shape, mass, charge, etc, do not have to have the same color associated with them. The conglomerate of all the particles of the same parameter together can generate a specific color or sparkle pattern. This would be considered one color. Colors could include some components that respond to light differently, such as sparkle or glow in the dark, or respond to certain wavelengths of light—such as UV or IR. The overall desired effect could be defined to a color selection for these particles.

Figure 3A:
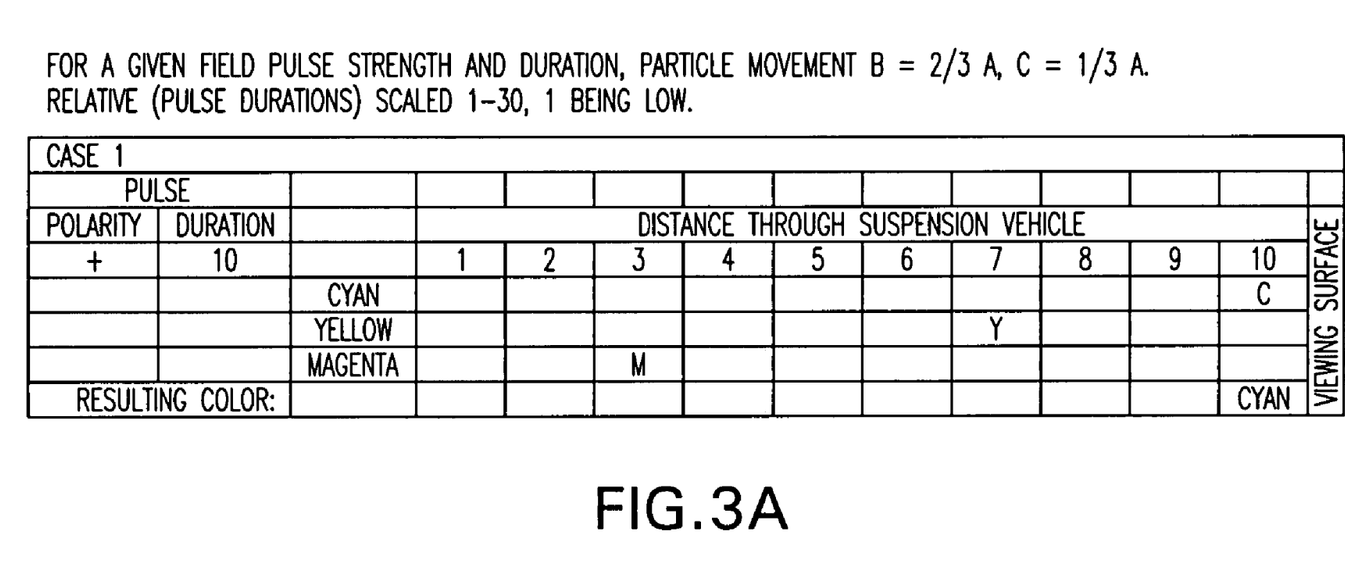
FIG. 3 illustrates various cases in which the stylus was activated in order to create colors in the color whiteboard display, according to another embodiment of the present invention.
Figure 3B:
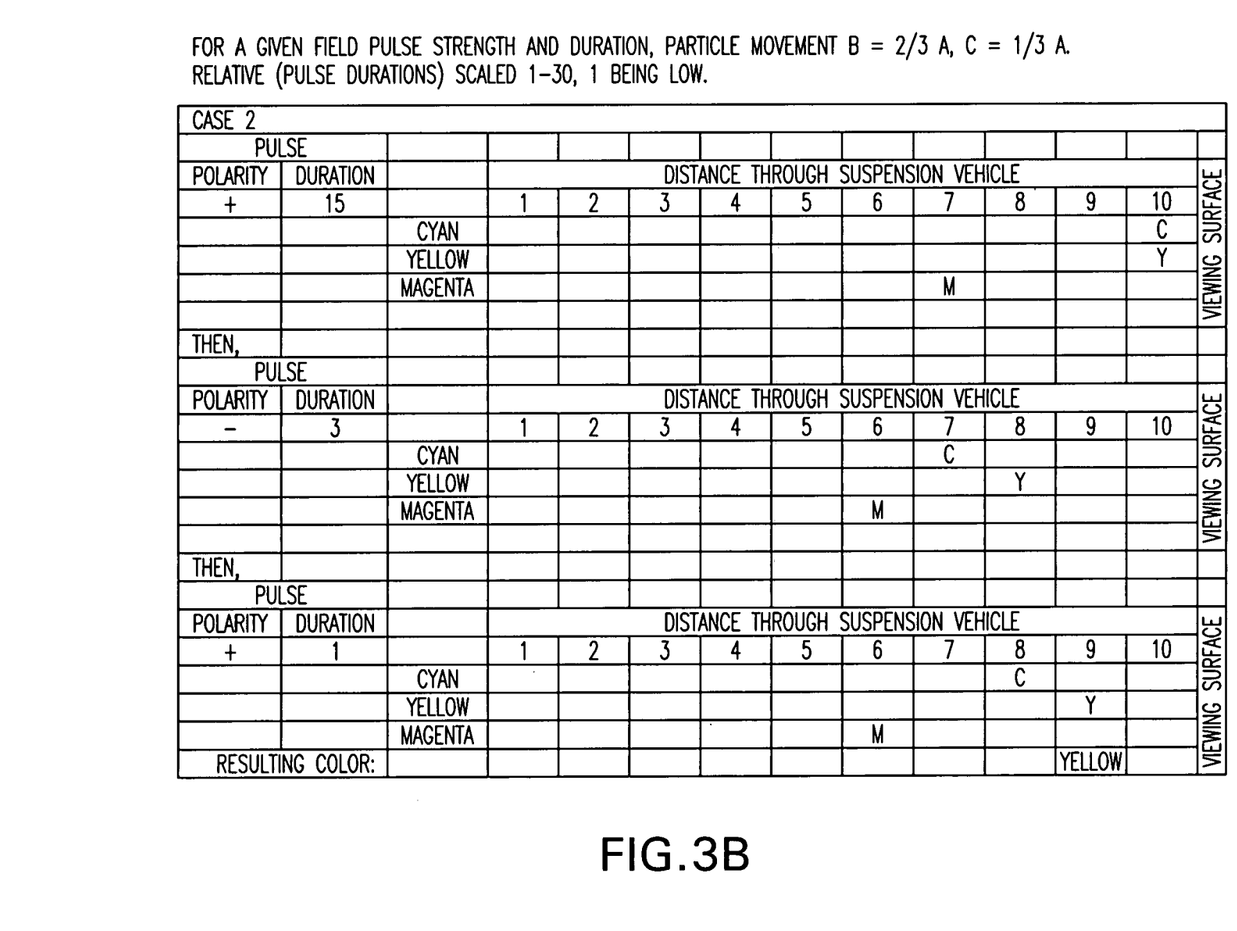
Figure 3C:
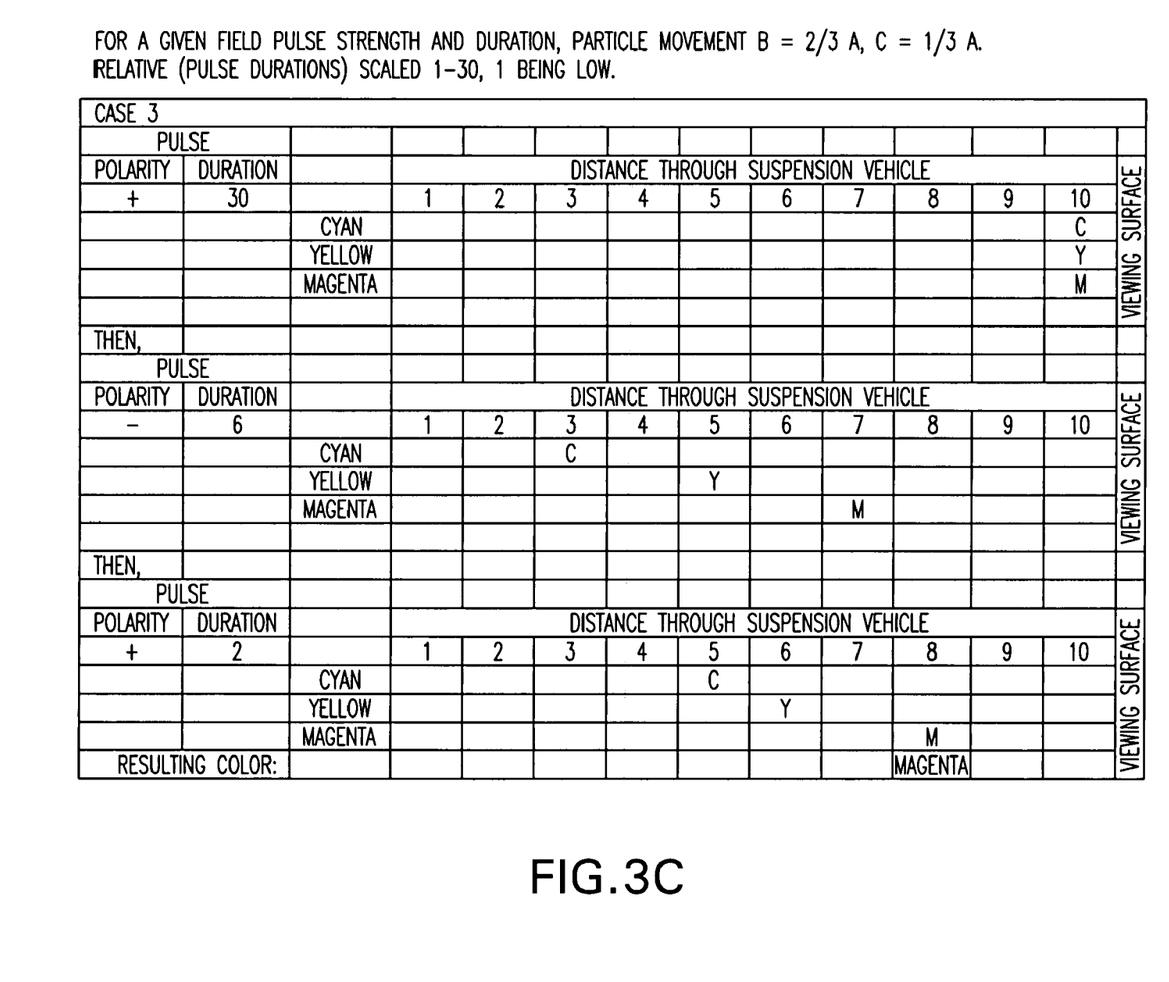

With respect to FIG. 3, a variety of charge field pattern cases for voltage potential or electric field 16 are illustrated. As shown in case 1, a positive polarity electric field was applied to 16 and the field was maintained for 10 duration units. The migration of color particles 8, 10, 12 for this electric field and duration resulted in a cyan color towards front surface 4. Yellow and magenta cannot be seen as the particles are too far from the front surface in this PSF translucent/white-reflective suspension material.

In case 2, a positive polarity electric field was applied to 16 and the field was maintained for 15 duration units. Next, the polarity was reversed (negative polarity) and held for three duration units. Finally, the polarity was reversed again (a positive polarity) and held for one duration unit. The last pattern of pulses can be repeated to move the resulting yellow spheres closer to the front surface until they are adequately visible. The migration of color particles 8, 10, 12 for these charge polarities and durations resulted in a yellow color towards front surface 4. Since the particles cannot get too close to the surface, due to visible contamination of the faster particles, the slower particles would have a higher saturated color associated with them. If it is physically larger, there is more color area visible through the suspended translucent material which compensates for the increased final distance. Note also that if the suspension translucent material is not as opaque, unique color combinations can be visibly generated by unique final placement of the particles and their size and distance from the front surface.

In case 3, a positive polarity was applied to charge 16 and the charge was maintained for 30 duration units. Next, the polarity was reversed (negative polarity) and held for six duration units. Finally, the polarity was reversed again (a positive polarity) and held for two duration units. The migration of color particles 8, 10, 12 for these charge polarities and durations resulted in a magenta color towards front surface 4.

Also, the present invention can be embodied in any computer-readable medium for use by or in connection with an instruction-execution system, apparatus or device such as a computer/processor based system, processor-containing system or other system that can fetch the instructions from the instruction-execution system, apparatus or device, and execute the instructions contained therein. In the context of this disclosure, a "computer-readable medium" can be any means that can store, communicate, propagate or transport a program for use by or in connection with the instruction-execution system, apparatus or device. The computer-readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc. It is to be understood that the computer-readable medium could even be paper or another suitable medium upon which the program is printed, as the program can be electronically captured, via, for instance, optical scanning of the paper or other medium, then compiled, interpreted or otherwise processed in a single manner, if necessary, and then stored in a computer memory.

Those skilled in the art will understand that various embodiment of the present invention can be implemented in hardware, software, firmware or combinations thereof. Separate embodiments of the present invention can be implemented using a combination of hardware and software or firmware that is stored in memory and executed by a suitable instruction-execution system. If implemented solely in hardware, as in an alternative embodiment, the present invention can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In preferred embodiments, the present invention can be implemented in a combination of software and data executed and stored under the control of a computing device.

It will be well understood by one having ordinary skill in the art, after having become familiar with the teachings of the present invention, that software applications may be written in a number of programming languages now known or later developed.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A display device, the device comprising:
   a transparent surface;
   a suspension media disposed against the transparent surface, wherein the suspension media further comprises suspension media thickness adjusters;
   at least three various color particles disposed throughout the suspension media, wherein each color of particle has a different migration time response to an applied electric field than each other color of particle; and
   an input instrument located substantially adjacent to the transparent surface such that the instrument is operated to cause a portion of the color particles to migrate towards the transparent surface and a reverse side such that the reverse side is oppositely biased to repel the color particle.

2. The display device, as in claim 1, wherein the transparent surface is further comprised of:
   a material that is able to pass an electric field so that the input instrument is able to apply an electric field to the plurality of various color particles.

3. The display device, as in claim 2, the transparent surface is further comprised of:
   a pixelated, conductive surface.

4. The display device, as in claim 1, wherein the transparent surface is further comprised of:
   PET.

5. The display device, as in claim 1, wherein the suspension media is further comprised of:
   a particle suspension fluid (PSF) having a low dielectric constant.

6. The display device, as in claim 5, wherein the suspension media is further comprised of:
   a translucent material.

7. The display device, as in claim 1, wherein the suspension media thickness adjusters are further comprised of:
   a standoff located substantially on the transparent surface.

8. The display device, as in claim 1, wherein the plurality of various color particles is further comprised of:
   glass spheres.

9. The display device, as in claim 1, wherein the plurality of various color particles is further comprised of:
   color particles substantially located in a container having a transparent top surface.

10. The display device, as in claim 1, wherein the plurality of various color particles is further comprised of:
    a diameter for each color of the color particles can be varied so that particles of each color will take a different amount of time to migrate to the transparent surface.

11. The display device, as in claim 1, wherein each of the plurality of various color particles has a like mass to each other like colored particle and a dissimilar mass to each other colored particle.

12. The display device, as in claim 1, wherein each of the plurality of various color particles has a like charge to each other like colored particle and a dissimilar charge to each other colored particle.

13. The display device, as in claim 1, wherein the input instrument is further comprised of:
    a stylus.

14. The display device, as in claim 13, wherein the stylus is further comprised of:
    a strobe that is designed to present electric field patterns at the point where the stylus substantially contacts the transparent surface.

15. The display device, as in claim 1, wherein the stylus is further comprised of:
    an electronic strobing so that the stylus can subtract certain color particles.

16. The display device, as in claim 1, wherein the input instrument is further comprised of:
    numerous styli that can be employed such that the styli include patterns and/or colors that designate the color(s) that the particular styli is able to pull towards the transparent surface.

17. The display device, as in claim 1, wherein the device is further comprised of:
    a back plate.

18. The display device, as in claim 17, wherein the back plate is constructed of any suitable material that is able to conduct electricity so that the input instrument is able to apply an electric field to the color particles.

19. The display device, as in claim 17, wherein the back plate is comprised of an opaque material.

20. The display device, as in claim 17, wherein the back plate is comprised of a conductive material applied to the back plate as a continuous plane.

21. The display device, as in claim 17, wherein the back plate is comprised of a conductive material applied to the back plate in cell patterns of a desired size.

22. The display device, as in claim 17, wherein the back plate is comprised of:
    PET.

23. The display device, as in claim 17, wherein the display device is comprised of:
    an erase bar.

24. A method for displaying, comprising the steps of:
    placing an electric field pattern upon a portion of an input instrument;
    locating the charged instrument substantially adjacent to a transparent surface;
    causing at least one of at least three various color particles disposed throughout a suspension media to migrate towards the transparent surface, wherein each color of particle has a different migration time response to an applied electric field than each other color of particle; and
    applying a reset pulse from the instrument to the color particles to pull the particles to a known state.

25. The method for displaying, as in claim 24, wherein the method is further comprised of the step of:
    selectively controlling placement of an electric field to at least one of the plurality of various color particles.

26. The method for displaying, as in claim 24, wherein the method is further comprised of the step of:
    controlling a sequence of electric field pulses to selectively urge a selected color of particles towards the transparent surface.

27. The method for displaying, as in claim 26, wherein the controlling step is further comprised of the step of:
    controlling field pulse lengths.

28. The method for displaying, as in claim 26, wherein the controlling step is further comprised of the step of:
    controlling field pulse magnitudes.

29. The method for displaying, as in claim 26, wherein the controlling step is further comprised of the step of:
controlling field polarity.

30. The method for displaying, as in claim 24, wherein the method is further comprised of the step of:
oppositely biasing the instrument to repel the color particles.

31. The method for displaying, as in claim 30, wherein the method is further comprised of the step of:
applying an electronic strobing to the instrument so that the instrument can subtract a portion of the plurality of various color particles.

32. The method for displaying, as in claim 30, wherein the method is further comprised of the step of:
applying a reverse voltage potential to the instrument.

33. The method for displaying, as in claim 30, wherein the method is further comprised of the step of:
utilizing an erase bar.

34. The method for displaying, as in claim 30, wherein the method is further comprised of the step of:
applying a reverse pulse pattern by the instrument.

35. The method for displaying, as in claim 24, wherein the method is further comprised of the step of:
applying an electric field an a back plate and the instrument to cause the particles to migrate towards the back plate and/or the transparent surface.

36. The method for displaying, as in claim 35, wherein the method is further comprised of the step of:
controlling a differential pulse pattern by pulsing the back plate with a zero average bias.

37. The method for displaying, as in claim 24, wherein the method is further comprised of the step of:
applying a magnetic field upon the instrument.

38. A system for displaying, comprising:
means for placing an electric field pattern upon a portion of an input instrument;
means for locating the charged instrument substantially adjacent to a transparent surface;
means for causing at least one of at least three various color particles disposed throughout a suspension media to migrate towards the transparent surface, wherein each color of particle has a different migration time response to an applied electric field than each other color of particle; and
means for applying a reset pulse from the instrument to the color particles to pull the particles to a known state.

39. The system, as in claim 38, wherein the system is further comprised of:
means for selectively controlling placement of an electric field to at least one of the plurality of various color particles.

40. The system, as in claim 38, wherein the system is further comprised of:
means for controlling a sequence of electric field pulses to selectively urge a selected color of particles towards the transparent surface.

41. The system, as in claim 40, wherein the controlling means is further comprised of:
means for controlling field pulse lengths.

42. The system, as in claim 40, wherein the controlling means is further comprised of:
means for controlling field pulse magnitudes.

43. The system, as in claim 40, wherein the controlling means is further comprised of:
means for controlling field polarity.

44. The system, as in claim 38, wherein the system is further comprised of:
means for oppositely biasing the instrument to repel the color particles.

45. The system, as in claim 44, wherein the system is further comprised of:
means for applying an electronic strobing to the instrument so that the instrument can subtract a portion of the plurality of various color particles.

46. The system, as in claim 44, wherein the system is further comprised of:
means for applying a reverse voltage potential to the instrument.

47. The system, as in claim 44, wherein the system is further comprised of:
means for utilizing an erase bar.

48. The system, as in claim 44, wherein the system is further comprised of:
means for applying a reverse pulse pattern by the instrument.

49. The system, as in claim 38, wherein the system is further comprised of:
means for applying an electric field on a back plate and the instrument to cause the particles to migrate towards the back plate and/or the transparent surface.

50. The system, as in claim 49, wherein the system is further comprised of:
means for controlling a differential pulse pail em by pulsing the back plate with a zero average bias.

51. The system, as in claim 38, wherein the system is further comprised of:
means for applying a magnetic field upon the instrument.

52. A program storage medium readable by a computer, tangibly embodying a program of instructions executable by the computer to perform a method for displaying, comprising the steps of:
placing an electric field pattern upon a portion of an input instrument;
locating the charged instrument substantially adjacent to a transparent surface; causing at least one of at least three various color particles disposed throughout a suspension media to migrate towards the transparent surface, wherein each color of particle has a different migration time response to an applied electric field than each other color of particle; and
applying a reset pulse from the instrument to the color particles to pull the particles to a known state.

53. The method for displaying, as in claim 52, wherein the method is further comprised of the step of:
selectively controlling placement of an electric field to at least one of the plurality of various color particles.

54. The method for displaying, as in claim 52, wherein the method is further comprised of the step of:
controlling a sequence of electric field pulses to selectively urge a selected color of particles towards the transparent surface.

55. The method for displaying, as in claim 54, wherein the controlling step is further comprised of the step of:
controlling field pulse lengths.

56. The method for displaying, as in claim 54, wherein the controlling step is further comprised of the step of:
controlling field pulse magnitudes.

57. The method for displaying, as in claim 54, wherein the controlling step is further comprised of the step of:
controlling field polarity.

58. The method for displaying, as in claim 52, wherein the method is further comprised of the step of:
oppositely biasing the instrument to repel the color particles.

59. The method for displaying, as in claim 58, wherein the method is further comprised of the step of:
   applying an electronic strobing to the instrument so that the instrument can subtract a portion of the plurality of various color particles.

60. The method for displaying, as in claim 58, wherein the method is further comprised of the step of:
   applying a reverse voltage potential to the instrument.

61. The method for displaying, as in claim 58, wherein the method is further comprised of the step of:
   utilizing an erase bar.

62. The method for displaying, as in claim 58, wherein the method is further comprised of the step of:
   applying a reverse purse pattern by the instrument.

63. The method for displaying, as in claim 52, wherein the method is further comprised of the step of:
   applying an electric field on a back plate and the instrument to cause the particles to migrate towards the back plate and/or the transparent surface.

64. The method for displaying, as in claim 63, wherein the method is further comprised of the step of:
   controlling a differential pulse pattern by pulsing the back plate with a zero average bias.

65. The method for displaying, as in claim 52, wherein the method is further comprised of the step of:
   applying a magnetic field upon the instrument.

* * * * *

UNITED STATES PATENT AND TRADEMARK OFFICE
CERTIFICATE OF CORRECTION

PATENT NO.         : 7,142,350 B2  
APPLICATION NO. : 10/960795  
DATED                 : November 28, 2006  
INVENTOR(S)       : May et al.

It is certified that error appears in the above-identified patent and that said Letters Patent is hereby corrected as shown below:

Col. 8 (line 28), delete "whereIn" and insert therefor --wherein--.

Col. 10 (line 26), delete "pail em" and insert therefor --pattern--.

Signed and Sealed this

Fourth Day of September, 2007

JON W. DUDAS  
*Director of the United States Patent and Trademark Office*